United States Patent
Boutenko et al.

(10) Patent No.: US 7,194,065 B1
(45) Date of Patent: Mar. 20, 2007

(54) METHOD AND APPARATUS FOR CONTROL OF EXPOSURE IN RADIOLOGICAL IMAGING SYSTEMS

(75) Inventors: Vladislav Boutenko, Paris (FR); Remy Klausz, Neuilly-sur-Seine (FR)

(73) Assignee: GE Medical Systems SA (FR)

(*) Notice: Subject to any disclaimer, the term of this patent is extended or adjusted under 35 U.S.C. 154(b) by 0 days.

(21) Appl. No.: 09/516,122

(22) Filed: Mar. 1, 2000

(30) Foreign Application Priority Data

Mar. 4, 1999 (FR) .................................. 99 02711

(51) Int. Cl.
*H05G 1/44* (2006.01)
(52) U.S. Cl. ..................................... 378/108; 378/98.7
(58) Field of Classification Search ............... 378/97, 378/108, 98.7, 205, 162, 163
See application file for complete search history.

(56) References Cited

U.S. PATENT DOCUMENTS

| | | | |
|---|---|---|---|
| 4,590,603 A * | 5/1986 | Relihan et al. ............. | 378/108 |
| 5,617,462 A | 4/1997 | Spratt | |
| 6,233,310 B1 * | 5/2001 | Relihan et al. ............. | 378/108 |

FOREIGN PATENT DOCUMENTS

| | | |
|---|---|---|
| DE | 196 24 094 A | 6/1997 |
| EP | 0 754 474 A | 1/1997 |
| EP | 0 979 027 A | 8/2001 |
| JP | S60-160599 A | 8/1985 |
| JP | H01-077035 A | 3/1989 |
| JP | H02-034159 A | 2/1990 |
| JP | H05-335094 A | 12/1993 |
| JP | UM-H06-038398 | 10/1994 |

* cited by examiner

*Primary Examiner*—Edward J. Glick
*Assistant Examiner*—Hoon Song
(74) *Attorney, Agent, or Firm*—Cantor Colburn LLP

(57) ABSTRACT

Method and apparatus for adjustment of the entrance dose of a radiology apparatus of the type containing a means of X-ray beam emission, a means of detection of the X-ray beam after it has crossed an object having to be visualized, and a means of visualization connected to the means of detection, in which the distance between the means of emission and the object is estimated and, when the distance between the means of emission and the object or the distance between the means of emission and the means of detection varies, the entrance dose is modified according to said distances in order to maintain an appreciably constant equivalent dose in the plane containing the object, the distance between the means of emission and the means of detection being known.

23 Claims, 3 Drawing Sheets

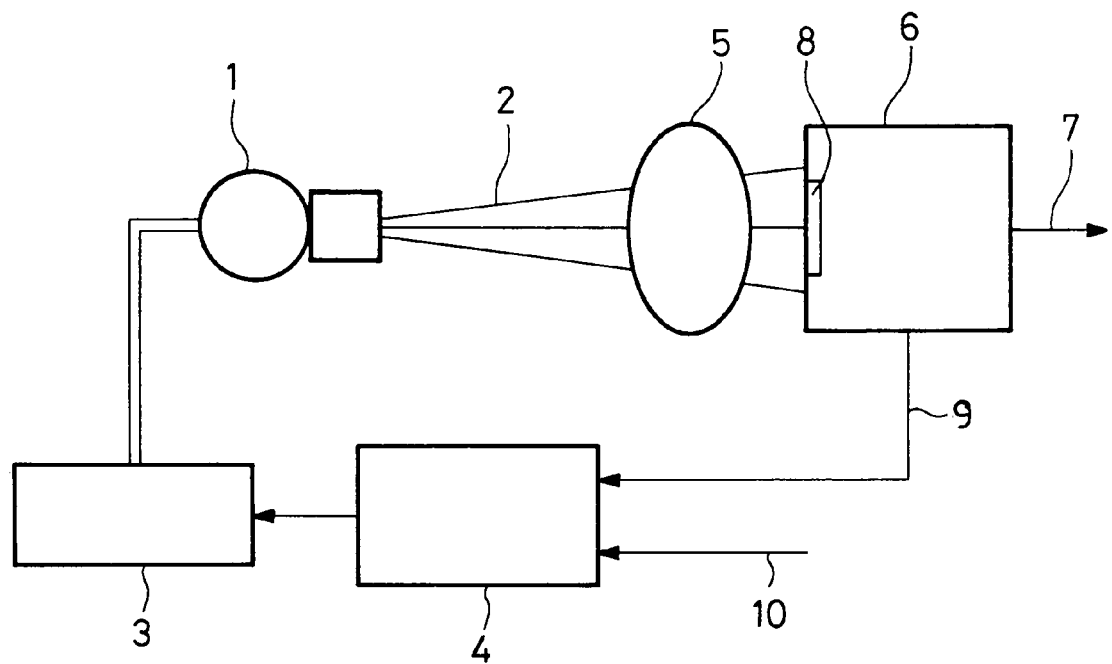
FIG_1
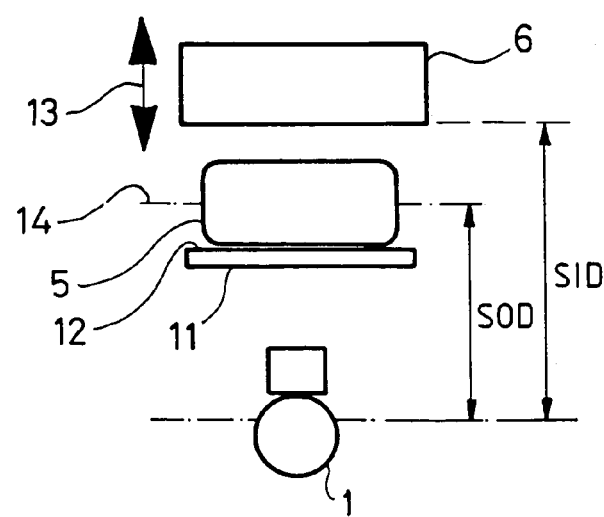
FIG_3

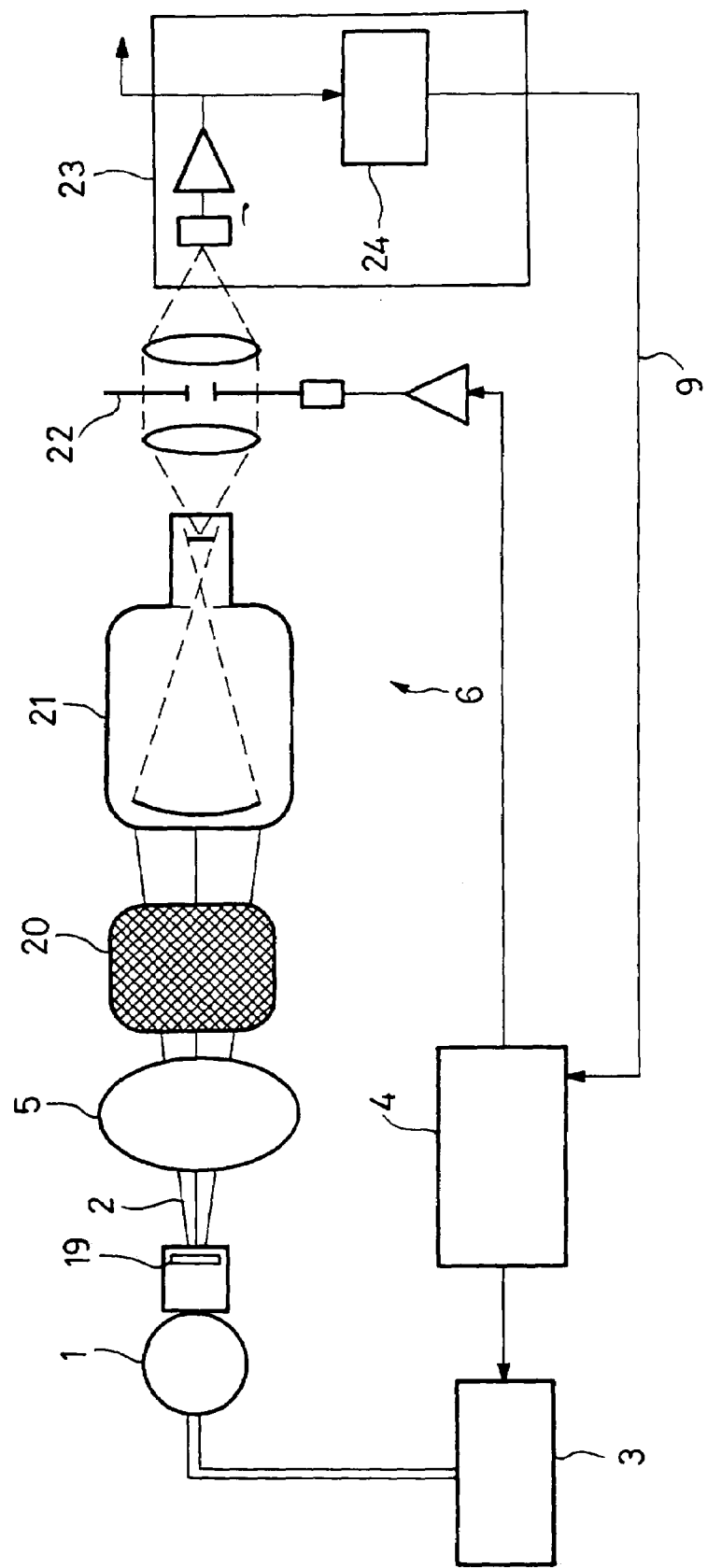
FIG_2

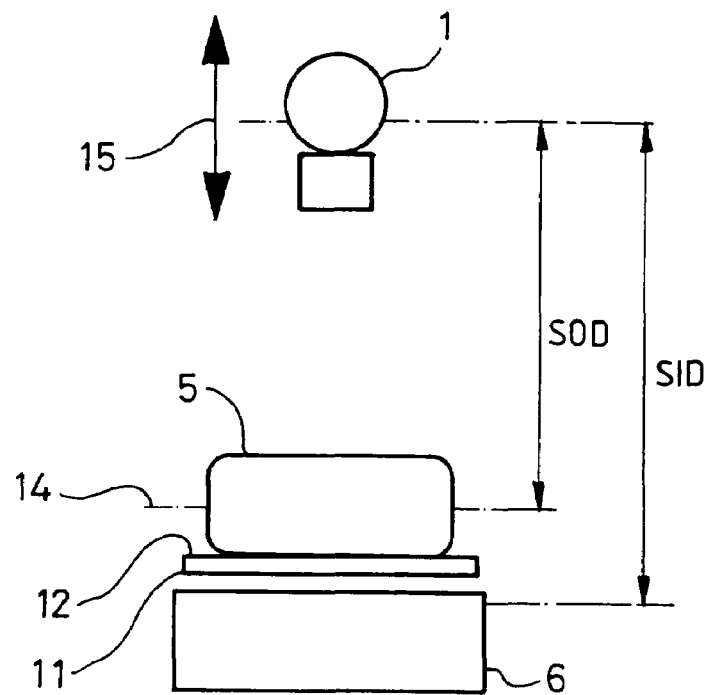
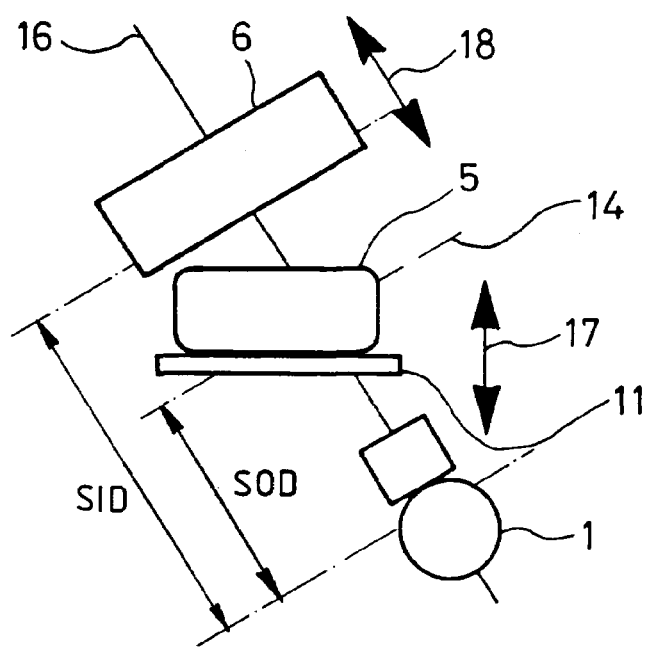

METHOD AND APPARATUS FOR CONTROL OF EXPOSURE IN RADIOLOGICAL IMAGING SYSTEMS

CROSS-REFERENCE TO RELATED APPLICATIONS

This application claims the benefit of a priority under 35 USC 119(a)-(d) to French Patent Application No. 99 02711 filed Mar. 4, 1999, the entire contents of which are hereby incorporated by reference.

BACKGROUND OF THE INVENTION

The present invention concerns the field of radiological imaging. An object such as a human being or an animal or an object if a human being or animal to be studied under X-rays is placed between an X-ray source and a means of detection making possible a visualization of the X-ray beam after it crosses the object.

The control of radiological image exposure usually comprises keeping the brightness of the visible images constant. This principle is derived from the first constant sensitivity image receptors, notably, radiographic films for static images and fluorescent screens for fluoroscopy.

The known systems using indirect image receptors, based, for example, on image intensifiers, reproduce that behavior by having, for a given application, a fixed gain between the entrance exposure, also described as "entrance dose," and the brightness of the image displayed, by adjusting the gains of the radiology apparatus, such as the optical gain by means of a diaphragm placed in the optical path, or an electronic amplification, or by adjusting a digital gain coefficient. The only exception to this fixed gain is to be found in case the X-ray parameters reach their upper limits on radioscopy. In such case, the gain is increased in order to compensate for decrease of the signal. This method is generally known in video systems as automatic gain control.

The method used for brightness or entrance dose control comprises using the signal supplied by a sensor, the signal being representative of the entrance dose or brightness, and comparing it to a reference corresponding to the desired level. The result of that comparison is entered in a device controlling the parameters of the X-rays used to obtain the image (supply voltage of the tube, supply current of the tube or product of the current by time), for the purpose of restoring the level desired.

It is of interest to observe what happens when the geometric enlargement is modified, that is, when either the object to be studies under X-rays, or the X-ray source or the image receptor is moved along the axis of the X-ray beam. By neglecting the diffusion effects of radiations, the brightness sensor will react exclusively to changes in distance between the source and the receptor, according to the inverse square of that distance.

If the distance is increased, a control loop will produce an increase in the X-ray parameters, and inverts it if the distance is reduced.

Now, this method can present problems. The distance between the X-ray source and the plane containing a significant detail of the object of interest and the image of which must be obtained is called SOD, and the distance between the X-ray source and the X-ray detector is called SID. If the enlargement ratio, equal to the SID/SOD ratio, is modified without, however, changing the SID, the number of X photons crossing the detail of interest will be modified according to the square of that ratio. Consequently, the amplitude of the quantum noise associated with the number of photons and, therefore, the effective signal-to-noise ratio will be modified, even if the modification of enlargement has no effect on the spatial resolution.

When the change of enlargement is made through a change of SID, the resulting effect on the signal-to-noise ratio will depend on the combination of effects of the change in intensity of the source caused by the modification of SID and enlargement respectively. In all cases, the change of geometries by displacement of the image receptor opposite the object and by displacement of the object in the direction of the source will entail a significant increase in the X-ray dose received by the object.

BRIEF SUMMARY OF THE INVENTION

An embodiment of the present invention is an apparatus and method for variation of enlargement without increasing the X-ray dose received.

The apparatus and method serves to adjust the entrance dose (or entrance exposure) of a radiology apparatus of the type containing a source of radiation of an X-ray beam, a means of detection of the X-ray beam after it has crossed an object having to be visualized, and a means of visualization connected to the means of detection. The distance (SOD) between the radiation source and the object is estimated and, when the distance (SID) between the radiation source and the object or the distance between the radiation source and the means of detection varies, the entrance dose is modified according to these distances in order to maintain an appreciably constant equivalent dose in the plane containing the object, the distance (SID) between the radiation source and the means of detection being known.

BRIEF DESCRIPTION OF THE DRAWING

FIGS. 1 and 2 are schematic views of radiology apparatuses according to the prior art;

FIG. 3 is a schematic view of a radiology apparatus used with a standard table;

FIG. 4 is a schematic view of a radiology apparatus used with a moving table; and FIG. 5 is a schematic view of a radiology apparatus with C-arms with isocentric movements.

DETAILED DESCRIPTION OF THE INVENTION

As can be seen in FIG. 1, the radiology apparatus comprises an X-ray tube 1 capable of emitting an X-ray beam 2 having an axis of propagation 16. The X-ray tube 1 is supplied by a high-voltage source 3 controlled by a control unit 4. Placed on the path of the X-ray beam 2 are an object 5 having to be studied, for example, a part of a object's body, and a digital type image receptor 6, for example, a solid-state receptor, capable of emitting on output on a line 7 a digital signal representing the image obtained by the image receptor 6, which picks up the X-ray beam after it has crossed the object 5. The line 7 can be connected to image processing means and to display means, such as a screen, not represented.

The radiology apparatus also includes a brightness sensor 8 capable of emitting on the line 9 connected to the control unit 4 a signal representing the brightness of the image obtained. The brightness sensor can be formed by a part of the solid-state detector. The control unit 4 is also connected to a line 10 on which it receives a brightness reference signal in order to make possible a control of the voltage generator 3, so that the brightness level will be kept constant.

In the embodiment of FIG. 2, a filter 19 is placed in the X-ray beam exiting from the tube 1. The image receptor 6 includes a radiological image intensifier 21, an iris diaphragm 22 and a video camera 23 placed after the object 5 in the direction of propagation of the X-ray beam. The intensifier 21 carries out the transformation of the X-ray beam into a visible light beam. The diaphragm 22 is controlled by the control unit 4 and makes possible the adjustment of gain. The video camera 23 contains a cell matrix CCD and a dose or level estimator 24 connected to the control unit 4, and supplies on output a signal that is used to visualize the radiological image.

In an embodiment of the present invention, the distance between the X-ray tube and the detail or details of interest in the object is estimated and when the geometry changes, the image receptor entrance dose is changed, taking into account the SID and the SOD, for the purpose of reducing the variation of equivalent dose in the plane container the details of interest in the object 5 consecutive to the change of the SID and SOD.

As can be seen in FIG. 3, in the case of an imaging system where the tube is placed under the object, the distance between the X-ray tube 1 and the surface 12 of the table top 11 is constant and known. It is considered then that the detail of interest in the object's body is on the average at a constant height above the surface 12 of the table top 11, for example, 10 to 15 cm. That distance can be modified according to the actual examination in progress and a general knowledge of the anatomy, considering, for example, that a vertebra has a height of 5 cm.

The image receptor 6 is mobile perpendicular to the axis of the X-ray beam in the direction illustrated by the arrow 13. The plane 14 perpendicular to the axis 16 of the X-ray beam and in which the details of interest of the object's body are situated is then estimated and the SOD between the X-ray tube 1 and the detail of the object's body is deduced. The SID between the X-ray tube 1 and the image receptor 6 depends on the geometry of the radiology apparatus and is also known. One can then act on the supply parameters of the X-ray tube 1 so as to keep the equivalent dose received in the plane 14 constant, whatever the course of the SID, preferably by using a correction factor corresponding to the ratio between the square of the SOD and the square of the SID.

By way of example, in radioscopy, by taking as reference an SID equal to 1 m and an SOD equal to 0.85 m, with a dose rate at the entrance of the image receptor of 60 µR/s, if the image receptor is away from the object by a distance of 0.25 m, the SID becomes 1.25 m and the SOD remains constant. The $SOD^2/SID^2$ ratio passes from value 0.7225 to value 0.4624. The dose rate at the entrance of the image receptor passes from 60 µR/second to 60×(0.4624/0.7225)=38.4 µR/second. If, for an SID maintained equal to 1 m, the object is moved toward the X-ray tube by 0.15 m, the SOD is equal to 0.7 m and the $SOD^2/SID^2$ ratio then passes from 0.7225 to 0.49. The entrance dose rate in the image receptor then passes from 60 µR/second to 60×(0.49/0.7225)=40.7 µR/second.

In FIG. 4, the case where the image receptor 6 is placed under the table 11 is illustrated, the X-ray tube 1 being placed above the object 5 lying on the table 11. The distance between the image receptor 6 and the upper surface 12 of the table 11 is known and fixed. The detail of interest of the object's body 5 is situated in relation to the upper surface 12 at a distance that is estimated. In this case, the distance between the image receptor 6 and the plane 14 is then determined by estimate. The difference between the SID and the SOD is then known. One further learns the SID between the X-ray tube 1 and the image receptor 6, which depends on the geometry of the radiology apparatus and on the displacement of the X-ray tube 1 in the direction of the arrow 15. Knowing thus the SID and the SID-SOD difference, one can then calculate the SOD and the $SOD^2/SID^2$ ratio to be used for correction of the entrance dose in the image receptor 6.

In FIG. 5, the case of a radiology apparatus containing a C-arm with isocentric movement is illustrated. This type of radiology apparatus generally contains two or three axes of rotation making it possible to take images at different angles in relation to an immobile geometric isocenter situated in the plane 14 containing the detail of interest of the object's body. In this case, one takes the estimate according to which the detail of interest of the object's body is placed in the isocenter, the geometric position of which, relative to the radiology apparatus, is known. Plane 14 is therefore a plane perpendicular to the axis of propagation 16 of the X-ray beam. The isocenter lies at the intersection of the axis 16 and plane 14.

The table 11 remains horizontal, regardless of the movement of the radiology apparatus, and can be displaced vertically in height in the direction of the arrow 17. The position of the image receptor 6 is fixed in relation to the X-ray tube 1, apart from the fact that it can be displaced in the direction of the arrow 18, that is, along the axis 16 of propagation of the X-rays. The SID is therefore known, depending on the geometry of the radiology apparatus and displacement of the image receptor 6 along the axis 16. The SOD is known, depending on the geometry of the radiology apparatus, for the distance between the isocenter and the X-ray tube 1 remains constant. In the course of use of the radiology apparatus, the table 11 is displaced in height, so that the detail of the object's body having to be studied is placed in the isocenter or otherwise in immediate proximity to the isocenter.

Advantageously, when the image receptor is an image intensifier and the brightness signal is obtained from the video signal furnished by a video camera placed below the image intensifier in the direction of propagation of the X-rays, and when the optical gain is adjusted by means of a diaphragm placed between the image intensifier and the video camera, the diaphragm opening can be changed in a proportion making it possible to follow in real time variations of the geometric enlargement in a manner conforming to the invention, including an exact compensation by a factor equal to the $SOD^2/SID^2$ ratio.

When the detail of interest of the object's body or a material introduced in the object for medical needs has known dimensions or relative dimensions taken in relation to a reference under known particular conditions, it is possible to determine the real enlargement factor in the plane of the detail of interest by image processing means capable of recognizing the object in the images within a time compatible with operation of the automatic brightness control, to measure the dimensions of the object and to calculate the ratio between the reference dimension and the measured dimension.

An embodiment of the invention therefore provides a method and apparatus to reduce significantly the entrance dose received by the object, compared to the previously known methods. It is thus possible to uncouple the geometric aspect of enlargement from the possible improvement of the image supplied by an increase in radiation related to an element of the anatomy.

In an embodiment of the invention, the distance between the radiation source and an interesting detail of the object is estimated.

The entrance dose is advantageously modified according to the ratio of the square of the distance between the radiation source and the object and of the square of the distance between the radiation source and the means of detection.

In an embodiment of the invention, the distance between the radiation source and the object is estimated by approximation of the distance between the object and a table supporting the object, taking into account the object's morphology.

In an embodiment of the invention, the distance between the radiation source and the object is estimated by considering the object to be placed roughly on an axis of rotation of the radiology apparatus.

Advantageously, in case the radiology apparatus includes a diaphragm situated on an optical path and making it possible to adjust the attenuation of the quantity of light crossing it or any other optical means, such as, for example, a variable attenuation filter, the opening of the diaphragm or optical means is controlled to regulate the gain, so that an appreciably constant equivalent dose in the plane containing the object is maintained.

In an embodiment of the invention, knowing the real size of the object or of a material introduced in the object for medical needs, an image processing is carried out to recognize the object in the different images, the size of said object is measured and the ratio between the real size and the measured size is calculated in order to deduce its real enlargement factor.

Thus, the object's exposure to X-rays is reduced when a high enlargement is used. The use of overly high X-ray parameters is prevented when long source-image receptor distances are used with a sizable enlargement factor. In particular, one can avoid the use of overly high supply voltages of the X-ray source, which would risk producing a degradation of image contrast.

Various modifications in structure and/or steps and/or function may be made by one skilled in the art without departing from the scope of the invention.

What is claimed is:

1. A method of adjustment of the entrance dose of a radiology apparatus comprising means for providing an X-ray beam emission, a means for detection of the X-ray beam after it has crossed an object to be imaged, a diaphragm for adjusting the gain of the apparatus, and means for imaging connected to the means for detection, in which the distance between the means for emission and the means for detection is known from the geometry of the apparatus comprising:
    irradiating the object by the means for X-ray emission;
    detecting the X-ray beam after it has passed the object using the means for detection of the X-ray beam;
    estimating the distance between the means for emission and the object;
    maintaining an appreciably constant equivalent entrance dose irradiating the object in a plane containing the object by acting on the supply parameters of the means for X-ray beam emission in accordance with the estimated distance; and
    adjusting the gain of the radiology apparatus by the diaphragm;
    whereby the entrance dose is changed by a factor $SOD^2/SID^2$, where SOD is the estimated distance and SID is the distance between the means for emission and the means for detection.

2. The method according to claim 1 in which the distance between the means for emission and a detail of interest of the object is estimated.

3. The method according to claim 2 in which the distance between the means for emission and the object is estimated by approximation of the distance between the object and a table supporting the object, taking into account the object's morphology.

4. The method according to claim 3 in which the diaphragm is situated on a radiation path to adjust the attenuation of the quantity of radiation crossing it, the opening of the diaphragm is controlled to regulate the gain, so that an appreciably constant equivalent dose in the plane containing the object is maintained.

5. The method according to claim 3 in which knowing the real size of the object or of a material introduced in the object, an image processing is carried out to recognize the object in the different images, the size of the object in the different images or the material introduced in the different images as a result of geometrical modification of the radiology apparatus is measured and the ratio between the real size and the measured size is calculated in order to deduce its real enlargement factor.

6. The method according to claim 2 in which the distance between the means for emission and the object is estimated by considering the object to be placed roughly on an axis of rotation of the radiology apparatus, which axis permits taking of images at different angles in relation to an isocenter.

7. The method according to claim 6 in which the radiology diaphragm is situated on a radiation path to adjust the attenuation of the quantity of radiation crossing it, the opening of the diaphragm is controlled to regulate the gain, so that an appreciably constant equivalent dose in the plane containing the object is maintained.

8. The method according to claim 6 in which knowing the real size of the object or of a material introduced in the object, an image processing is carried out to recognize the object in the different images, the size of the object in the different images or the material introduced in the different images as a result of geometrical modification of the radiology apparatus is measured and the ratio between the real size and the measured size is calculated in order to deduce its real enlargement factor.

9. The method according to claim 2 in which the diaphragm is situated on a radiation path to adjust the attenuation of the quantity of radiation crossing it, the opening of the diaphragm is controlled to regulate the gain, so that an appreciably constant equivalent dose in the plane containing the object is maintained.

10. The method according to claim 2 in which knowing the real size of the object or of a material introduced in the object, an image processing is carried out to recognize the object in the different images, the size of the object in the different images or the material introduced in the different images as a result of geometrical modification of the radiology apparatus is measured and the ratio between the real size and the measured size is calculated in order to deduce its real enlargement factor.

11. The method according to claim 1 in which the distance between the means for emission and the object is estimated by approximation of the distance between the object and a table supporting the object, taking into account the object's morphology.

12. The method according to claim 11 in which the diaphragm situated on a radiation path to adjust the attenuation of the quantity of radiation crossing it, the opening of the diaphragm is controlled to regulate the gain, so that an appreciably constant equivalent dose in the plane containing the object is maintained.

13. The method according to claim 11 in which knowing the real size of the object or of a material introduced in the object, an image processing is carried out to recognize the object in the different images, the size of the object in the different images or the material introduced in the different images as a result of geometrical modification of the radiology apparatus is measured and the ratio between the real size and the measured size is calculated in order to deduce its real enlargement factor.

14. The method according to claim 1 in which the distance between the means for emission and the object is estimated by considering the object to be placed roughly on an axis of rotation of the radiology apparatus, which axis permits taking of images at different angles in relation to an isocenter.

15. The method according to claim 14 in which the diaphragm is situated on a radiation path to adjust the attenuation of the quantity of radiation crossing it, the opening of the diaphragm is controlled to regulate the gain, so that an appreciably constant equivalent dose in the plane containing the object is maintained.

16. The method according to claim 14 in which knowing the real size of the object or of a material introduced in the object, an image processing is carried out to recognize the object in the different images, the size of the object in the different images or the material introduced in the different images as a result of geometrical modification of the radiology apparatus is measured and the ratio between the real size and the measured size is calculated in order to deduce its real enlargement factor.

17. The method according to claim 1 in which the diaphragm is situated on a radiation path to adjust the attenuation of the quantity of radiation crossing it, the opening of the diaphragm is controlled to regulate the gain, so that an appreciably constant equivalent dose in the plane containing the object is maintained.

18. The method according to claim 17 in which knowing the real size of the object or of a material introduced in the object, an image processing is carried out to recognize the object in the different images, the size of the object in the different images or the material introduced in the different images as a result of geometrical modification of the radiology apparatus is measured and the ratio between the real size and the measured size is calculated in order to deduce its real enlargement factor.

19. The method according to claim 1 in which knowing the real size of the object or of a material introduced in the object, an image processing is carried out to recognize the object in the different images, the size of the object in the different images or the material introduced in the different images as a result of geometrical modification of the radiology apparatus is measured and the ratio between the real size and the measured size is calculated in order to deduce its real enlargement factor.

20. Radiology apparatus comprising:
means for emission of an X-ray beam;
means for detection of the X-ray beam after it has crossed an object to be imaged;
means for imaging connected to the means for detection;
a diaphragm for adjusting the gain of the apparatus;
wherein a first distance between the means for emission and the object is estimated;
wherein a second distance between the means for emission and the means for detection is known;
wherein when a third distance between the means for emission and the object or a fourth distance between the means for emission and the means for detection varies;
means for modifying an entrance dose of the X-ray beam to the means for detection by acting on the supply parameters of the means for X-ray emission in accordance with the estimated distance; and
the diaphragm causing the adjustment of the entrance dose to be changed by a factor according to the ratio of the square of the distance between the means for emission and the object and to the square of the distance between the means for emission and the means for detection.

21. The apparatus according to claim 20 in which the diaphragm is situated on a radiation path to adjust the attenuation of the quantity of radiation crossing it, the opening of the diaphragm is controlled to regulate the gain, so that an appreciably constant equivalent dose in the plane containing the object is maintained.

22. A method of adjustment of the entrance dose of a radiology apparatus comprising means for providing an X-ray beam emission, means for detection of the X-ray beam after it has crossed an object to be imaged, means for adjusting the gain of the apparatus, and means for imaging connected to the means for detection, in which the distance between the means for emission and the means for detection is known from the geometry of the apparatus comprising:
irradiating the object by the means for X-ray emission;
detecting the X-ray beam after it has passed the object using the means for detection of the X-ray beam;
estimating the distance between the means for emission and the object;
maintaining an appreciably constant equivalent entrance dose irradiating the object in a plane containing the object by acting on the supply parameters of the means for X-ray beam emission in accordance with the estimated distance; and
adjusting the gain of the radiology apparatus by the means for adjusting;
whereby the entrance dose is changed by a factor $SOD^2/SID^2$, where SOD is the estimated distance and SID is the distance between the means for emission and the means for detection.

23. Radiology apparatus comprising:
means for emission of an X-ray beam;
means for detection of the X-ray beam after it has crossed an object to be imaged;
means for imaging connected to the means for detection;
means for adjusting the gain of the apparatus;
wherein a first distance between the means for emission and the object is estimated;
wherein a second distance between the means for emission and the means for detection is known;
wherein when a third distance between the means for emission and the object or a fourth distance between the means for emission and the means for detection varies;
means for modifying an entrance dose of the X-ray beam to the means for detection by acting on the supply parameters of the means for X-ray emission in accordance with the estimated distance; and
the means for adjustment causing the entrance dose to be changed by a factor according to the ratio of the square of the distance between the means for emission and the object and to the square of the distance between the means for emission and the means for detection.

* * * * *

UNITED STATES PATENT AND TRADEMARK OFFICE
CERTIFICATE OF CORRECTION

PATENT NO. : 7,194,065 B1
APPLICATION NO. : 09/516122
DATED : March 20, 2007
INVENTOR(S) : Vladislav Boutenko et al.

It is certified that error appears in the above-identified patent and that said Letters Patent is hereby corrected as shown below:

Column 1:
Line 50, after "be", delete "studies" and insert therefor --studied--;

Column 2:
Line 37, insert --The present invention will be better understood by studying the detailed specification of some embodiments taken by way of nonlimitative example and illustrated by the attached drawings, in which: --

Column 3:
Line 20, after "plane", delete "container" and insert therefor --containing--;
Line 67, after "in", delete "this" and insert therefor --that--;

Column 5:
Line 47, after "emission", delete "a".

Signed and Sealed this

Third Day of July, 2007

JON W. DUDAS
*Director of the United States Patent and Trademark Office*